(12) United States Patent
Nagase

(10) Patent No.: US 8,579,559 B2
(45) Date of Patent: Nov. 12, 2013

(54) GROOVING WORK METHOD AND GROOVING WORK APPARATUS

(75) Inventor: Yasuo Nagase, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 955 days.

(21) Appl. No.: 12/651,215

(22) Filed: Dec. 31, 2009

(65) Prior Publication Data

US 2010/0104386 A1 Apr. 29, 2010

Related U.S. Application Data

(63) Continuation-in-part of application No. PCT/JP2008/002444, filed on Sep. 4, 2008.

(30) Foreign Application Priority Data

Sep. 6, 2007 (JP) ................................. 2007-231683

(51) Int. Cl.
  *B23C 5/28* (2006.01)
(52) U.S. Cl.
  USPC .......................................... 409/132; 409/143
(58) Field of Classification Search
  USPC ............. 409/132, 131, 143; 29/889, 557–558
  See application file for complete search history.

(56) References Cited

U.S. PATENT DOCUMENTS

| | | | |
|---|---|---|---|
| 5,911,548 A * | 6/1999 | Deiss et al. | 409/234 |
| 5,931,616 A * | 8/1999 | Daub | 409/132 |
| 6,164,877 A | 12/2000 | Kamata et al. | |
| 6,322,296 B1 | 11/2001 | Wetli et al. | |
| 2003/0138301 A1 | 7/2003 | Kuerzel | |

FOREIGN PATENT DOCUMENTS

| | | |
|---|---|---|
| EP | 1 967 307 A1 | 9/2008 |
| JP | 06-270006 A | 9/1994 |
| JP | 2000-254812 A | 9/2000 |
| JP | 2001-328019 A | 11/2001 |
| JP | 2004-507369 A | 3/2004 |
| JP | 2004-291103 A | 10/2004 |
| JP | 2007-144610 A | 6/2007 |
| WO | WO 01/96055 A1 | 12/2001 |

OTHER PUBLICATIONS

Machine Translation of EP 1967307, which EP '307 was published Sep. 2008.*

* cited by examiner

*Primary Examiner* — Erica E Cadugan
(74) *Attorney, Agent, or Firm* — Foley & Lardner LLP

(57) ABSTRACT

When a groove having a section of Christmas tree shape for fitting the blade legs of a turbine is to be generated in the outer circumference of a turbine shaft by cutting work, cutting blades cut that groove by moving them gradually in a direction perpendicular to an axis parallel to female groove center line while rotating them on the axis. Three wide portions are cut one by one. A method for that grooving work includes a first cutting step of cutting a slope portion, an outer circumference portion and an undercut portion by using a first cutting tool, and a second cutting step of cutting a constricted portion by using a second cutting tool.

6 Claims, 11 Drawing Sheets

FIG.9A
FIG.9B
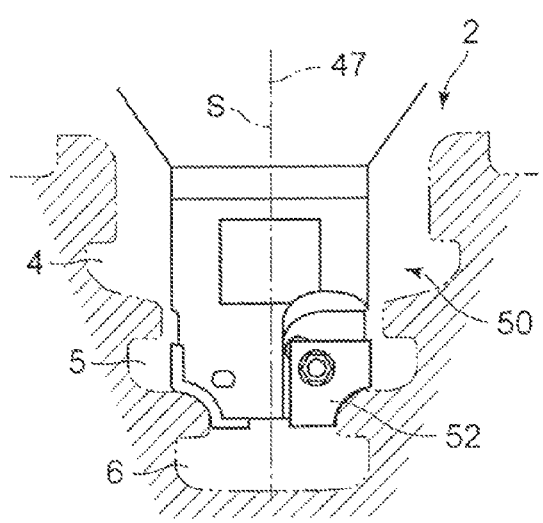
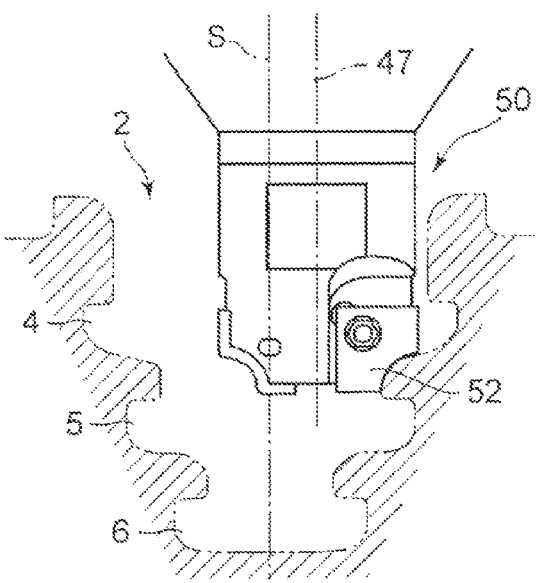

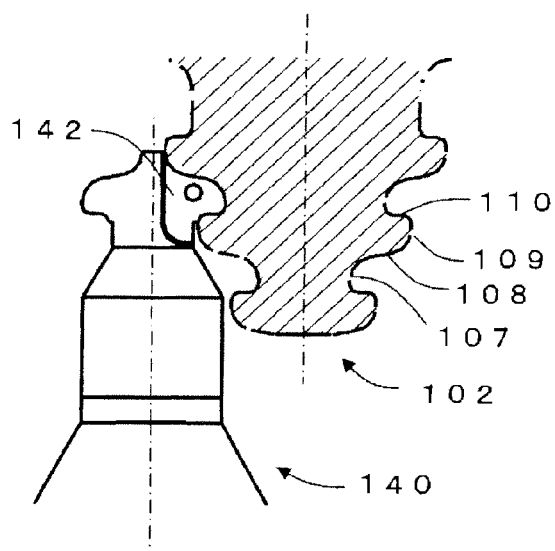 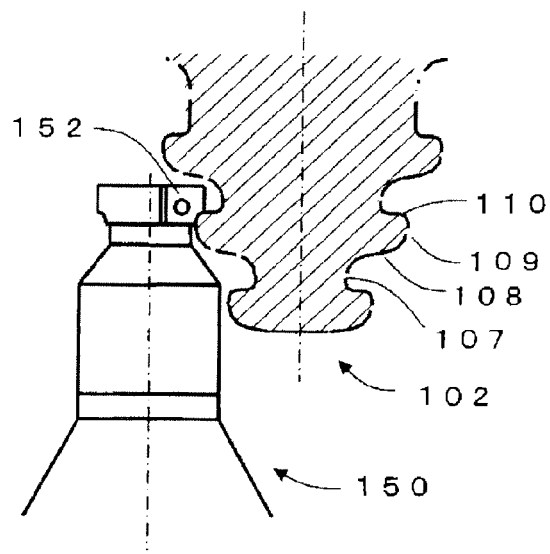

GROOVING WORK METHOD AND GROOVING WORK APPARATUS

CROSS REFERENCES TO RELATED APPLICATIONS

This application is a continuation-in-part (CIP) application of the International Application PCT/JP2008/02444, the International Filing Date of which is Sep. 4, 2008, the entire content of which is incorporated herein by reference, and claims the benefit of priority from the prior Japanese Patent Application No. 2007-231683, filed in the Japanese Patent Office on Sep. 6, 2007, the entire content of which is incorporated herein by reference.

BACKGROUND OF THE INVENTION

The present invention relates to a grooving (groove cutting) work method and a cutting apparatus for forming a groove having a cross-section of a Christmas tree shape for fitting the blade legs of a turbine in the outer circumference of a turbine shaft.

A large sized and high power turbine is used in a high-efficiency combined cycle power generation plant. As a structure for fitting the impeller of such a turbine to a turbine shaft, there is known a structure in which turbine impeller blades 3 are fitted, one by one, in a number of tree-shaped grooves 2 having a cross-section of a Christmas tree shape formed in the outer circumference of a turbine shaft 1 as illustrated in FIG. 12 (refer to Japanese PCT National Publication No. 2004-507369).

FIG. 13 is a cross-sectional view illustrating a female tree-shaped groove in an enlarged manner. The tree-shaped groove has a symmetrical shape with respect to a groove center line S, in which the groove width is gradually tapered as a whole in the depth direction (in the downward direction of the drawing) while it is increased and decreased repeatedly. In the tree-shaped groove, three large-width portions 4, 5, and 6 each having a large width are arranged apart from each other in the groove depth direction. A large-width portion nearer to an opening portion 30 (formed at a shallower position) has a larger width, and large-width portion nearer to a bottom portion 31 (formed at a deeper position) has a smaller width. In the following description, as illustrated in FIG. 13, a constricted portion is referred to as a constricted portion 7, an inclined surface on the opposite side of the opening portion 30 (inclined surface facing the opening portion 30) is referred to as an incline surface portion 8, an outer circumferential portion is referred to as an outer circumferential portion 9, and an inclined surface on the opening portion 30 side is referred to as an undercut portion 10. In terms of quality, very strict accuracy is required for the distances of the undercut portion 10 in the groove depth direction between the large-width portions 4 and 5 and between the large-width portions 5 and 6.

A typical rotary cutting tool used in conventional tree-shaped groove cutting has a body obtained by integrally forming a shank portion and a blade portion. The blade portion has a shape in which conical portions and constricted portions are alternately arranged. A cutting blade portion is provided in the length area of each blade portion. The type of the cutting blade includes a straight blade and a right hand or left hand twisted blade which is excellent in cutting performance. In general, two to four cutting blades are provided.

In the above conventional rotary cutting tool, the difference in the diameter of the outermost portion between the constricted portion and the conical portion is large, which increases the difference in the cutting speed. Concerning the cutting speed, the optimum condition range is determined depending on the type of a cutting tool material and the type of a work material. If the cutting speed exceeds the condition range, an increase in tool wear occurs. For example, if cutting is carried out with the optimum cutting speed set in accordance with the outer diameter of the constricted portion, the cutting speed becomes higher at the conical portion, with result that the tool wear is increased.

Further, in the conventional rotary cutting tool, the contact length between the work material and the cutting blade is large, so that cutting resistance becomes large, making it easy to cause chatter. As a result, it is difficult to carry out cutting with a small milling machine having a low main shaft power and a low rigidity.

BRIEF SUMMARY OF THE INVENTION

The present invention has been made in view of the above situation, and an object thereof is to make the cutting speeds at respective portions substantially equal when a groove having a cross section of a Christmas tree shape for fitting the blade legs of a turbine is to be formed in the outer circumference of a turbine shaft by cutting.

In order to achieve the object, according to the present invention, there is provided a grooving work method for forming a groove having a cross section of a Christmas tree shape for fixing blade legs of a turbine to an outer circumference of a turbine shaft by fitting between a female groove and a male groove, wherein: the female groove has a cross section symmetrical with respect to a center line extending from a groove opening portion to a groove bottom portion and has two or more large-width portions extending to both sides in a groove width direction and one or more constricted portions disposed one by one between adjacent large-width portions, the large-width portion and the constricted portion being configured such that the nearer they are to the groove opening portion, the larger the width in the groove width direction; the grooving work method is a method that performs cutting by gradually moving a cutting blade in a direction perpendicular to an axis parallel to the center line while rotating the cutting blade about the axis, comprises at least a first cutting step of performing cutting by using a first cutting tool and a second cutting step of performing cutting by using a second cutting tool different from the first cutting tool, and continuously forms the two or more large-width portions one by one by using the first cutting tool.

According to the present invention, there is also provided a grooving work apparatus that forms a groove having a cross section of a Christmas tree shape for fixing blade legs of a turbine to an outer circumference of a turbine shaft by fitting between a female groove and a male groove, wherein: the female groove has a cross section symmetrical with respect to a center line extending from a groove opening portion to a groove bottom portion and has two or more large-width portions extending to both sides in a groove width direction and one or more constricted portions disposed one by one between adjacent large-width portions, the large-width portion and the constricted portion being configured such that the nearer they are to the groove opening portion, the larger the width in the groove width direction, the grooving work apparatus has means for gradually moving a cutting blade in a direction perpendicular to an axis parallel to the center line while rotating the cutting blade about the axis and is configured to selectively use at least first and second cutting tools that can be detachably installed thereto and to continuously form the two or more large-width portions one by one by using the first cutting tool.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 9A is an elevation view continued from FIG. 8F, illustrating a process using a second cutting tool in the procedure of forming a female tree-shaped groove using the second embodiment of the grooving work method according to the present invention;

FIG. 9B is an elevation view continued from FIG. 9A, illustrating a process using the second cutting tool in the procedure of forming a female tree-shaped groove using the second embodiment of the grooving work method according to the present invention;

FIG. 10A is a cross-sectional view illustrating a situation in which a male tree-shaped groove is formed using the third embodiment of the grooving work method according to the present invention and in which a first cutting tool is used to carry out cutting;

FIG. 10B is a cross-sectional view illustrating a situation in which a male tree-shaped groove is formed using the third embodiment of the grooving work method according to the present invention and in which a second cutting tool is used to carry out cutting;

DETAILED DESCRIPTION OF THE INVENTION

First Embodiment

Figure 1A:
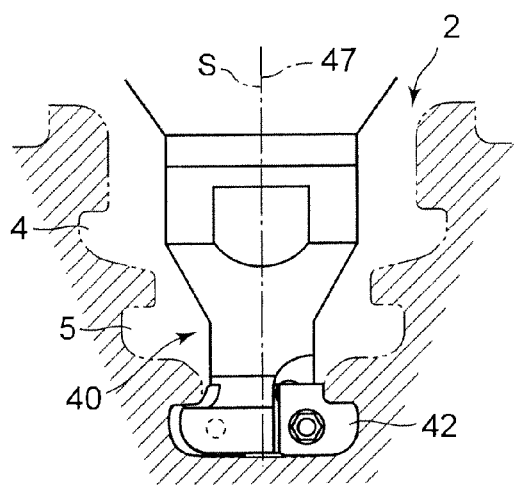
FIG. 1A is an elevation view illustrating a process using a first cutting tool in a procedure of forming a female tree-shaped groove using the first embodiment of the grooving work method according to the present invention.

A first embodiment of a grooving work method and a grooving work apparatus according to the present invention will be described with reference to FIGS. 1A to 5. Same reference numerals are given to the same or corresponding parts as those in the prior art, and the overlapped description will be omitted.

Figure 1B:
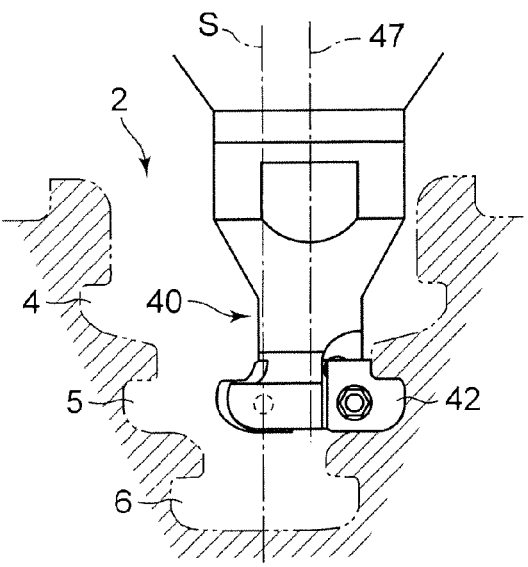
FIG. 1B is an elevation view continued from FIG. 1A, illustrating a process using the first cutting tool in the procedure of forming a female tree-shaped groove using the first embodiment of the grooving work method according to the present invention.
Figure 1C:
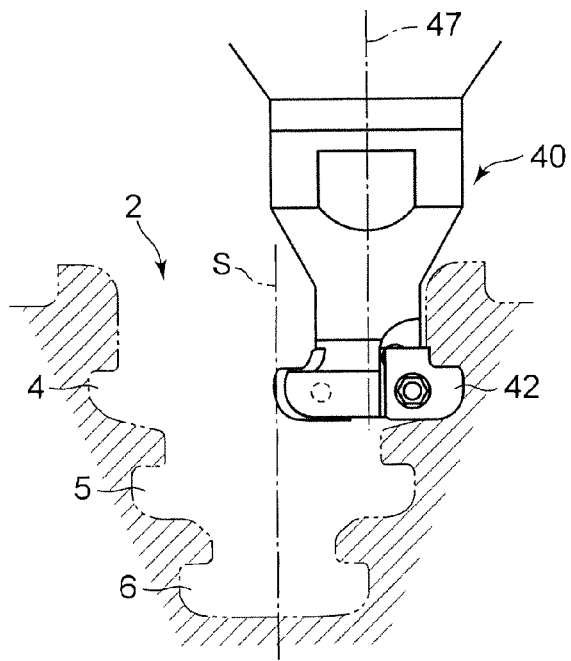
FIG. 1C is an elevation view continued from FIG. 1B, illustrating a process using the first cutting tool in the procedure of forming a female tree-shaped groove using the first embodiment of the grooving work method according to the present invention.
Figure 2A:
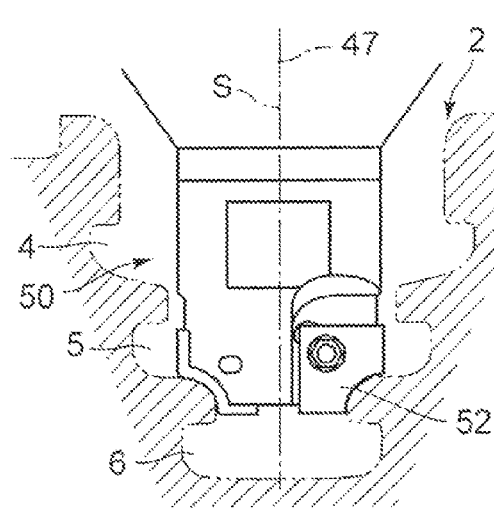
FIG. 2A is an elevation view continued from FIG. 1C, illustrating a process using a second cutting tool in the procedure of forming a female tree-shaped groove using the first embodiment of the grooving work method according to the present invention.
Figure 2B:
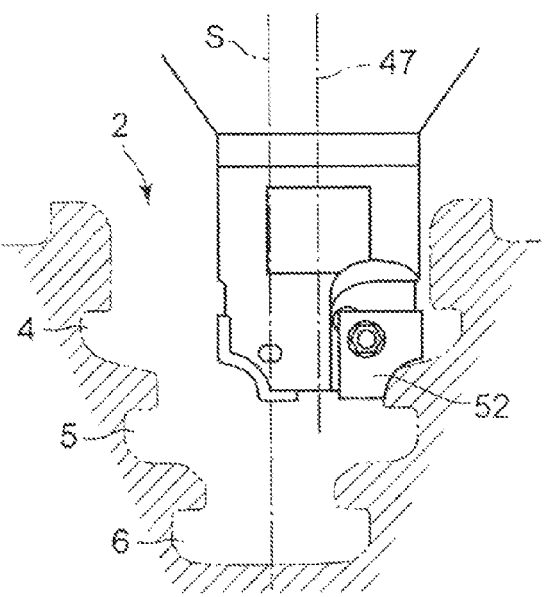
FIG. 2B is an elevation view continued from FIG. 2A, illustrating a process using the second cutting tool in the procedure of forming a female tree-shaped groove using the first embodiment of the grooving work method according to the present invention.
Figure 3:
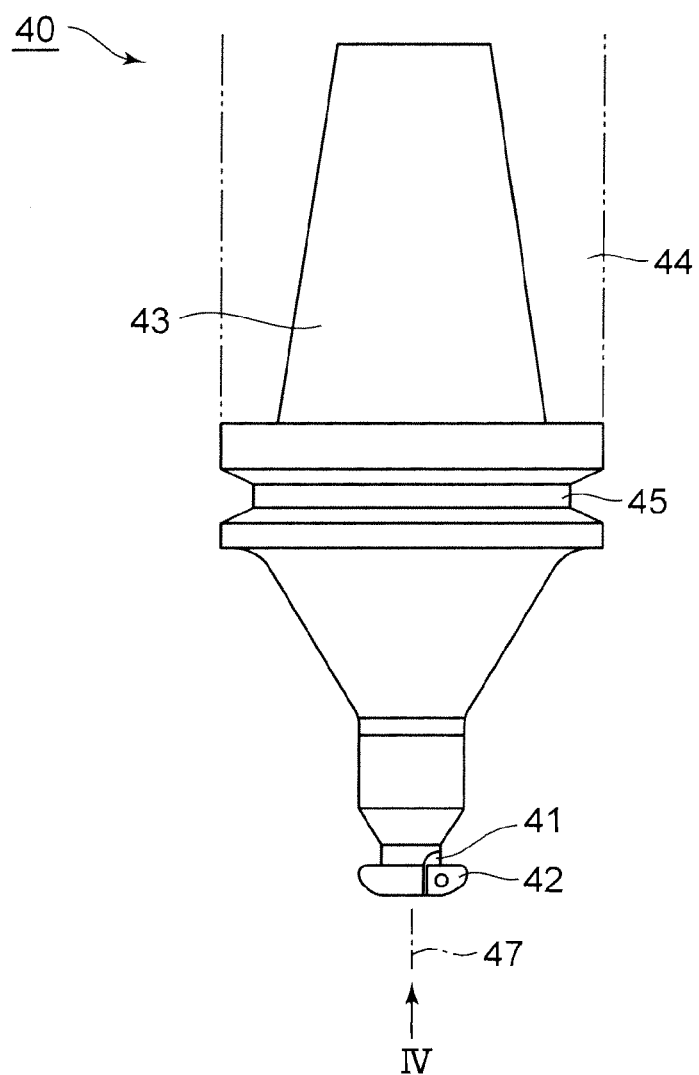
FIG. 3 is a front view illustrating an embodiment of the first cutting tool used in the grooving work method according to the present invention.
Figure 4:
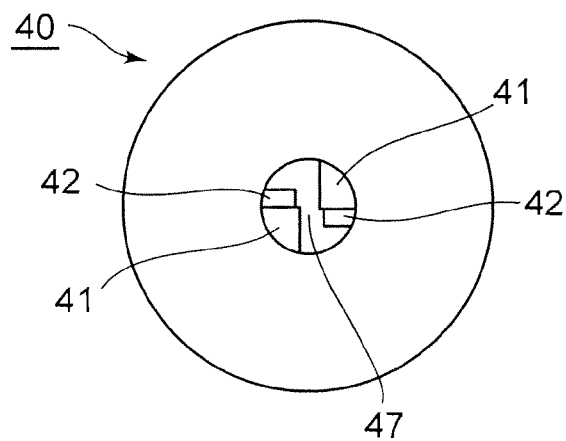
FIG. 4 is a bottom view as viewed in the direction of an arrow IV of FIG. 3.
Figure 5:
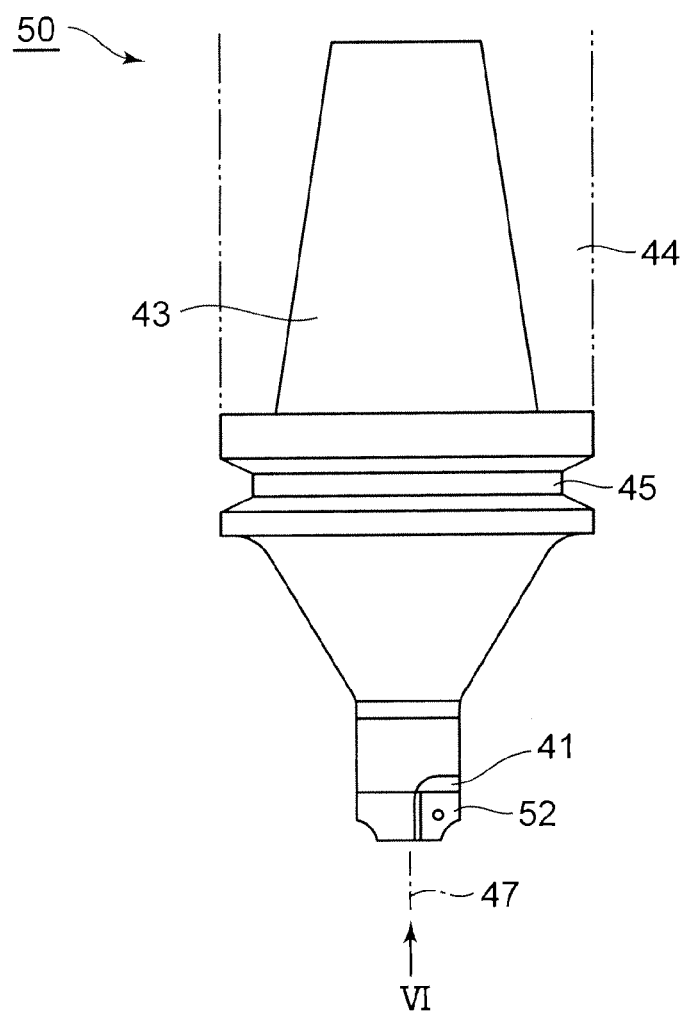
FIG. 5 is a front view illustrating an embodiment of the second cutting tool used in the grooving work method according to the present invention.
Figure 6:
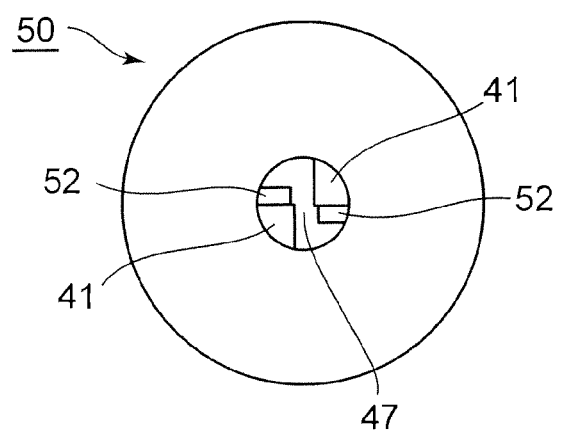
FIG. 6 is a bottom view as viewed in the direction of an arrow VI of FIG. 5.

FIGS. 1A to 1C are elevation views sequentially illustrating processes using a first cutting tool in a procedure of forming a female tree-shaped groove using the first embodiment of the grooving work method according to the present invention. FIGS. 2A and 2B are elevation views continued from FIG. 1C, sequentially illustrating processes using a second cutting tool. FIG. 3 is a front view illustrating an embodiment of the first cutting tool used in the grooving work method according to the present invention. FIG. 4 is a bottom view of the first cutting tool as viewed in the direction of an arrow IV of FIG. 3. FIG. 5 is a front view illustrating an embodiment of the second cutting tool used in the grooving work method according to the present invention. FIG. 6 is a bottom view of the second cutting tool as viewed in the direction of an arrow VI of FIG. 5.

The present embodiment represents a case where a female tree-shaped groove 2 for fitting a blade 3 of a turbine impeller to a turbine shaft 1 is formed in the turbine shaft 1 by cutting. A specific example of the dimension of the tree-shaped groove 2 is as follows: width of the opening portion 30 is 24.03 mm; width of the large-width portion 4 having the largest width is 37.44 mm, depth of the groove is 32.89 mm, curvature radius of a corner portion is 6.35 mm, and curvature radius of the bottom portion 31 is 31.75 mm. In the present embodiment, the heights of the large-width portions 4, 5, and 6 in the depth direction of the tree-shaped groove 2 are the same.

In the present embodiment, a first cutting tool 40 illustrated in, e.g., FIGS. 3 and 4 and a second cutting tool 50 illustrated in, e.g., FIGS. 5 and 6 are prepared in carrying out grooving work, and they are selectively installed to a machine such as a milling machine, a boring facing-and-drilling machine, or machining center. The first and second cutting tools 40 and 50 each have an arm changer fitting portion 45. An arm changer (not illustrated) is fitted in the arm changer fitting portion 45, and a tapered portion 43 is detachably fitted to a main shaft 44 of a machine such as a milling machine.

First and second cutting blades 42 and 52 having different shapes are attached to the leading end portions of the first and second cutting tools 40 and 50, respectively, and are configured to be rotated about a center axis 47 by the rotation of the main shaft 44. In the examples illustrated in the drawings, the two cutting blades 42 and two cutting blades 52 are arranged on the opposite sides with respect to the center axis 47, respectively. Further, two chip discharge grooves 41 for discharging chips generated with the rotation of the cutting blades 45 and 52 are arranged on the opposite sides with respect to the center axis 47. The first cutting blade 42 illustrated in FIG. 3 has a large convex shape directed toward the leading end portion and has a small concave shape on the groove opening portion side. The second cutting blade 52 illustrated in FIG. 5 has a concave shape directed toward the leading end portion.

With reference to FIGS. 1A to 1C and FIGS. 2A and 2B, a procedure of forming the female tree-shaped groove 2 in the present embodiment will be described. First, in the process illustrated in FIG. 1A, the first cutting tool 40 illustrated in FIGS. 3 and 4 is used to form the inclined surface portion 8, the outer circumferential portion 9, and the undercut portion 10 (refer to FIG. 13) of the large-width portion 6 at the deepest portion (in the direction toward the groove bottom portion). At this time, the center axis 47 of the rotation of the first cutting tool 40 substantially coincides with a groove center line S, and cutting is carried out by shifting the center axis 47 in the groove direction.

Next, in the process illustrated in FIG. 1B, the first cutting tool 40 is used to form the inclined surface portion 8, the outer circumferential portion 9, and the undercut portion 10 of the large-width portion 5. At this time, the center axis 47 of the rotation of the first cutting tool 40 is parallel to the groove center line S, and cutting is carried out by shifting the center axis 47 in the groove direction. Similarly, in the following processes, the center axis 47 of the rotation of the first cutting tool 40 is parallel to the groove center line S, and cutting is carried out by shifting the center axis 47 in the groove direction. Next, in the process illustrated in FIG. 1C, the first cutting tool 40 is used to form the inclined surface portion 8, the outer circumferential portion 9, and the undercut portion 10 of the large-width portion 4 positioned nearest to the opening portion.

Next, the first cutting tool 40 is removed from the main shaft 44 of the machine, and the second cutting tool 50 is installed to the machine. Then, in the process illustrated in FIG. 2A, the constricted portion 7 between the large-width portions 6 and 5 is formed. Finally, in the process illustrated in FIG. 2B, the second cutting tool 50 is used to form the constricted portion 7 between the large-width portions 5 and 4.

Figure 7B:
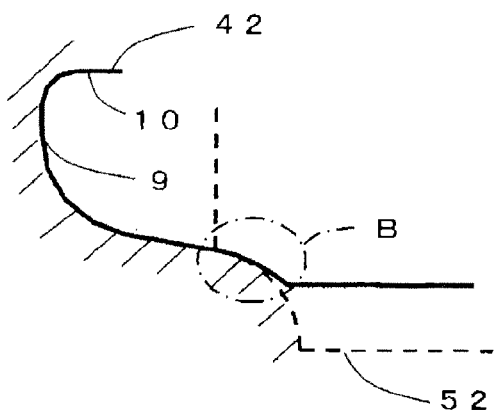
FIG. 7B is a view for explaining the shape of the connection portion between a cut portion formed by the first cutting tool and cut portion formed by the second cutting tool in the first embodiment of the grooving work method according to the present invention, which is a cross-sectional view illustrating a portion C of FIG. 7C in an enlarged manner and illustrates a case where the curvature radius of the first cutting tool is larger than that of the second cutting tool.
Figure 7C:
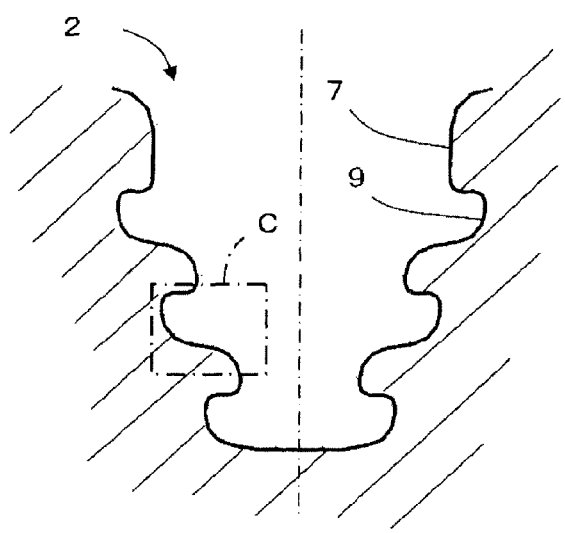
FIG. 7C is a view for explaining the shape of the connection portion between a cut portion formed by the first cutting tool and cut portion formed by the second cutting tool in the first embodiment of the grooving work method according to the present invention, which is a cross-sectional view illustrating the entire female tree-shaped groove.
Figure 7A:
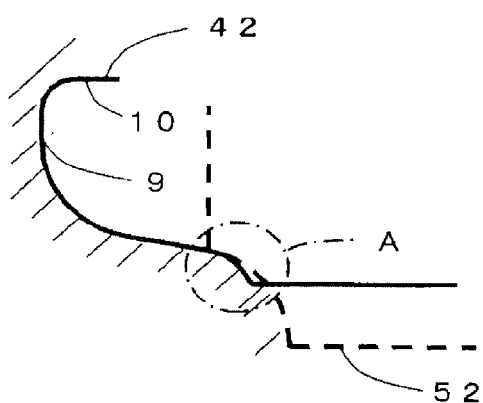
FIG. 7A is a view for explaining the shape of the connection portion between a cut portion formed by the first cutting tool and cut portion formed by the second cutting tool in the first embodiment of the grooving work method according to the present invention, which is a cross-sectional view illustrating a portion C of FIG. 7C in an enlarged manner and illustrates a case where the curvature radius of the first cutting tool is smaller than that of the second cutting tool.

FIGS. 7A, 7B, and 7C are views for explaining the shape of the connection portion between a cut portion formed by the first cutting tool and the cut portion formed by the second cutting tool in the first embodiment. FIG. 7C is a cross-sectional view illustrating the entire female tree-shaped groove. FIGS. 7A and 7B are cross-sectional views each illustrating a portion C of FIG. 7C in an enlarged manner. FIG. 7A illustrates a case where the curvature radius of the first cutting tool is smaller than that of the second cutting tool, and FIG. 7B illustrates a case where the curvature radius of the first cutting tool is larger than that of the second cutting tool.

As illustrated in FIGS. 7A, 7B, and 7C, the portion formed by the first cutting blade 42 of the first cutting tool 40 and the portion formed by the second cutting blade 52 of the second cutting tool 50 are connected through the constricted portion 7, and the cut portion of the connection portion has a cross-section of a convex shape. In the case where the curvature radius of the blade edge of the first cutting blade 42 at the connection portion is smaller than that of the blade edge of the second cutting blade 52, an uneven surface is unfavorably generated at the connection portion as illustrated by a portion A of FIG. 7A. On the other hand, in the case where the curvature radius of the blade edge of the first cutting blade 42 is larger than that of the blade edge of the second cutting blade 52, an uneven surface is not generated at the connection portion as illustrated by a portion B of FIG. 7B. In this case, it is preferable that the curvature radius of the blade edge of the first cutting blade 42 have a plus tolerance and the curvature radius of the blade edge of the second cutting blade 52 have a minus tolerance. In the case where, e.g., the nominal dimensions of these curvature radii are equal to each other, a configuration may be employed in which the curvature radius of the blade edge of the first cutting blade 42 has a plus tolerance and the curvature radius of the blade edge of the second cutting blade 52 has a minus tolerance.

Since strict accuracy is required for the distances between the undercut portions 10 of the large-width portions 4 and 5 and 6, the same first cutting tool 40 is used to continuously carry out the processes of FIGS. 1A to 1C. As a result, it is possible to eliminate the shape error between the same type tools or mounting error due to attachment/detachment of the tool, thereby achieving highly accurate shape formation.

According to the present embodiment, the cutting speeds at respective portions can be made substantially equal when a groove having a cross section of a Christmas tree shape is to be formed by cutting, whereby the cutting can be carried out under appropriate cutting conditions. Further, the contact length between the cutting blade and work material at the time of cutting is reduced, so that cutting resistance becomes smaller, making it rare to cause chatter. As a result, it is possible to carry out cutting even with a small milling machine having a low main shaft power and a low rigidity.

Further, although the cutting length is reduced as compared to the case of the abovementioned prior art, the cutting feed rate can be significantly increased, thereby achieving a reduction in cutting time.

Second Embodiment

A second embodiment of a grooving work method and a grooving work apparatus according to the present invention will be described with reference to FIGS. 8A to 8F and FIGS. 9A and 9B. FIGS. 8A to 8F are elevation views sequentially illustrating processes using a first cutting tool in a procedure of forming the female tree-shaped groove using the second embodiment of the grooving work method according to the present invention. FIGS. 9A and 9B are elevation views continued from FIG. 8F, sequentially illustrating processes using a second cutting tool. Same reference numerals are given to the same or corresponding parts as those in the first embodiment, and the overlapped description will be omitted.

The present embodiment can be applied also to a case where the widths (or height) of the large-width portions 4, 5, and 6 in the depth direction of the tree-shaped groove 2 differ from one another. The width of the first cutting blade 42 of the first cutting tool 40 in the depth direction of the tree-shaped groove 2 is smaller than each of the widths of the large-width portions 4, 5, and 6 in the depth direction of the tree-shaped groove 2.

Figure 8A:
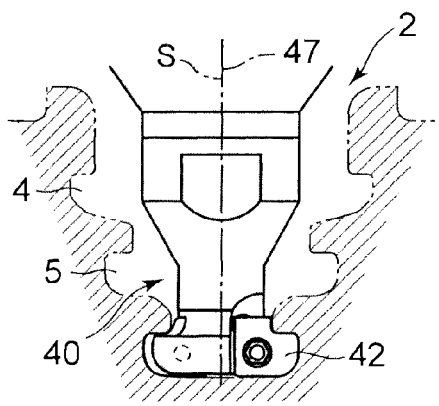
FIG. 8A is an elevation view illustrating a process using a first cutting tool in a procedure of forming a female tree-shaped groove using the second embodiment of the grooving work method according to the present invention.
Figure 8B:
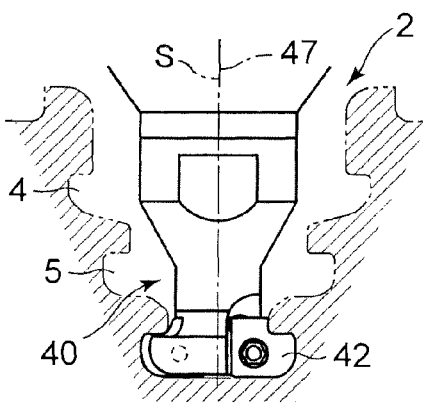
FIG. 8B is an elevation view continued from FIG. 8A, illustrating a process using the first cutting tool in the procedure of forming a female tree-shaped groove using the second embodiment of the grooving work method according to the present invention.

First, in the processes illustrated in FIGS. 8A and 8B, the first cutting tool 40 is used to form the inclined surface portion 8, the outer circumferential portion 9, and the undercut portion 10 of the large-width portion 6 at the deepest portion. In the process illustrated in FIG. 8A, the inclined surface portion 8 and a part of the outer peripheral portion 9 on the bottom portion 31 (refer to FIG. 13) side are formed in the large-width portion 6. And then, in the process illustrated in FIG. 8B, the axial direction position of the first cutting tool 40 is shifted to form a part of the outer peripheral portion 9 on the opening portion 30 side and undercut portion 10 in the large-width portion 6.

Figure 8C:
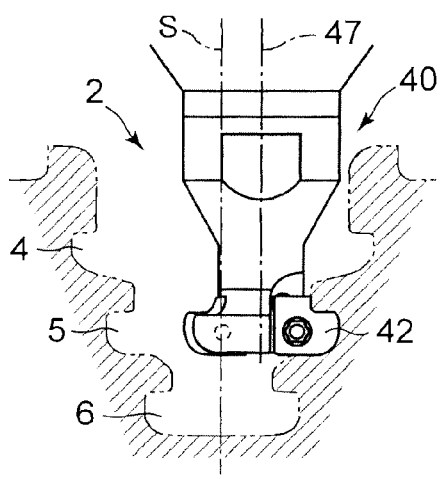
FIG. 8C is an elevation view continued from FIG. 8B, illustrating a process using the first cutting tool in the procedure of forming a female tree-shaped groove using the second embodiment of the grooving work method according to the present invention.
Figure 8D:
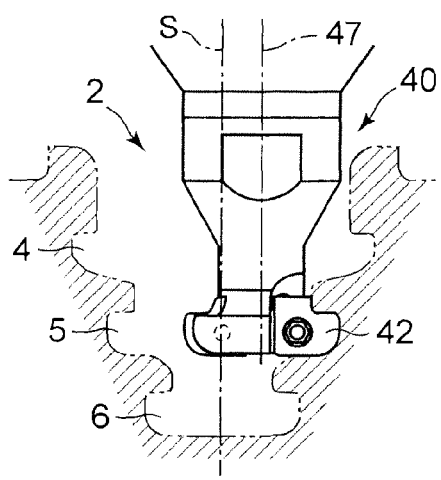
FIG. 8D is an elevation view continued from FIG. 8C, illustrating a process using the first cutting tool in the procedure of forming a female tree-shaped groove using the second embodiment of the grooving work method according to the present invention.

Next, in the processes illustrated in FIGS. 8C and 8D, the first cutting tool 40 is used to form the inclined surface portion 8, the outer circumferential portion 9, and the undercut portion 10 of the large-width portion 5. In the process illustrated in FIG. 8C, the inclined surface portion 8 and a part of the outer peripheral portion 9 on the bottom portion 31 side are formed in the large-width portion 5. And then, in the process illustrated in FIG. 8D, a part of the outer peripheral portion 9 on the opening portion 30 side and undercut portion 10 are formed in the large-width portion 5.

Figure 8E:
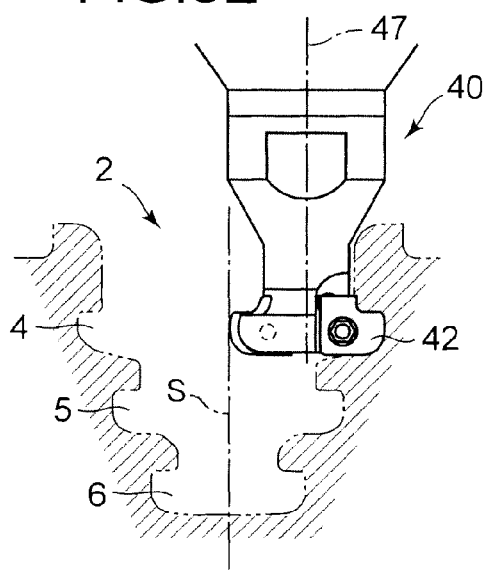
FIG. 8E is an elevation view continued from FIG. 8D, illustrating a process using the first cutting tool in the procedure of forming a female tree-shaped groove using the second embodiment of the grooving work method according to the present invention.
Figure 8F:
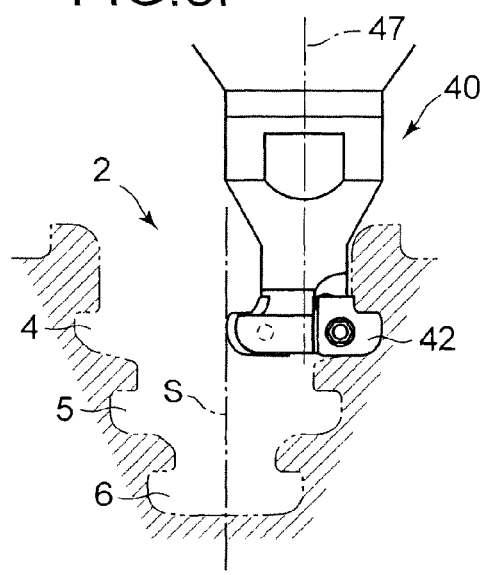
FIG. 8F is an elevation view continued from FIG. 8E, illustrating a process using the first cutting tool in the procedure of forming a female tree-shaped groove using the second embodiment of the grooving work method according to the present invention.

Next, in the processes illustrated in FIGS. 8E and 8F, the first cutting tool 40 is used to form the outer circumferential portion 9 and the undercut portion 10 of the large-width portion 4 positioned nearest to the opening portion. In the process illustrated in FIG. 8E, the inclined surface portion 8 and a part of the outer peripheral portion 9 on the bottom portion 31 side are formed in the large-width portion 4. And then, in the process illustrated in FIG. 8F, a part of the outer peripheral portion 9 on the opening portion 30 side and the undercut portion 10 are formed in the large-width portion 4.

Next, the first cutting tool 40 is removed from the main shaft 44 of the machine, and the second cutting tool 50 is installed to the machine. Then, in the process illustrated in FIG. 9A, the constricted portion 7 between the large-width portions 6 and 5 is formed. Finally, in the process illustrated in FIG. 9B, the constricted portion 7 between the large-width portions 5 and 4 is formed.

According to the present embodiment, the heights (depths) of the large-width portions 4, 5, and G of the tree-shaped groove 2 can arbitrarily be set in an independent manner from one another.

Third Embodiment

Figure 11A:
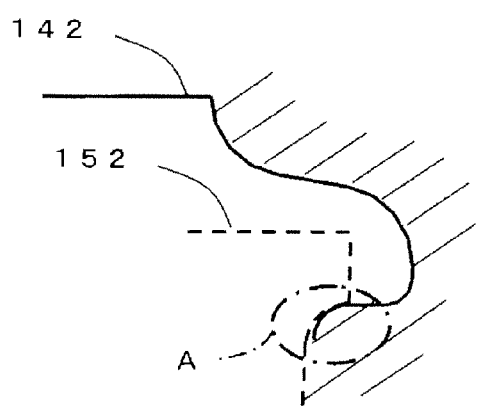
FIG. 11A is a view for explaining the shape of the connection portion between a cut portion formed by the first cutting tool and cut portion formed by the second cutting tool in the third embodiment of the grooving work method according to the present invention, which is a cross-sectional view illustrating a portion C of FIG. 11C in an enlarged manner and illustrates a case where the curvature radius of the first cutting tool is smaller than that of the second cutting tool.
Figure 11C:
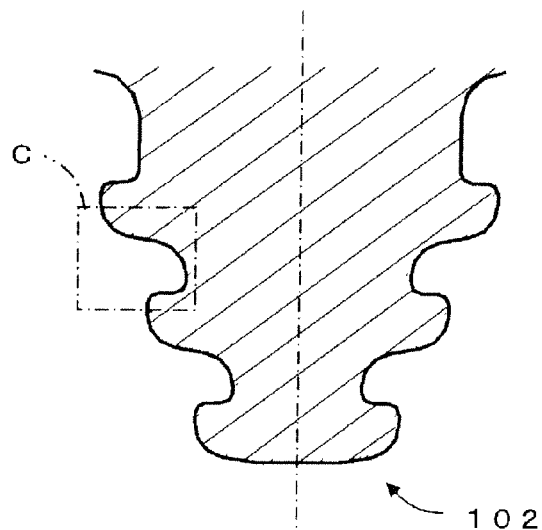
FIG. 11C is a view for explaining the shape of the connection portion between a cut portion formed by the first cutting tool and cut portion formed by the second cutting tool in the third embodiment of the grooving work method according to the present invention, which is a cross-sectional view illustrating the entire male tree-shaped groove.
Figure 11B:
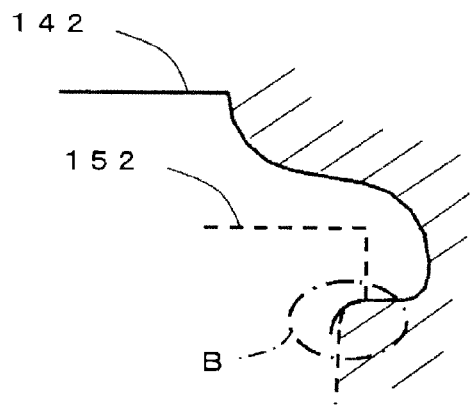
FIG. 11B is a view for explaining the shape of the connection portion between a cut portion formed by the first cutting tool and cut portion formed by the second cutting tool in the third embodiment of the grooving work method according to the present invention, which is a cross-sectional view illustrating a portion C of FIG. 11C in an enlarged manner and illustrates a case where the curvature radius of the first cutting tool is larger than that of the second cutting tool.
Figure 12:
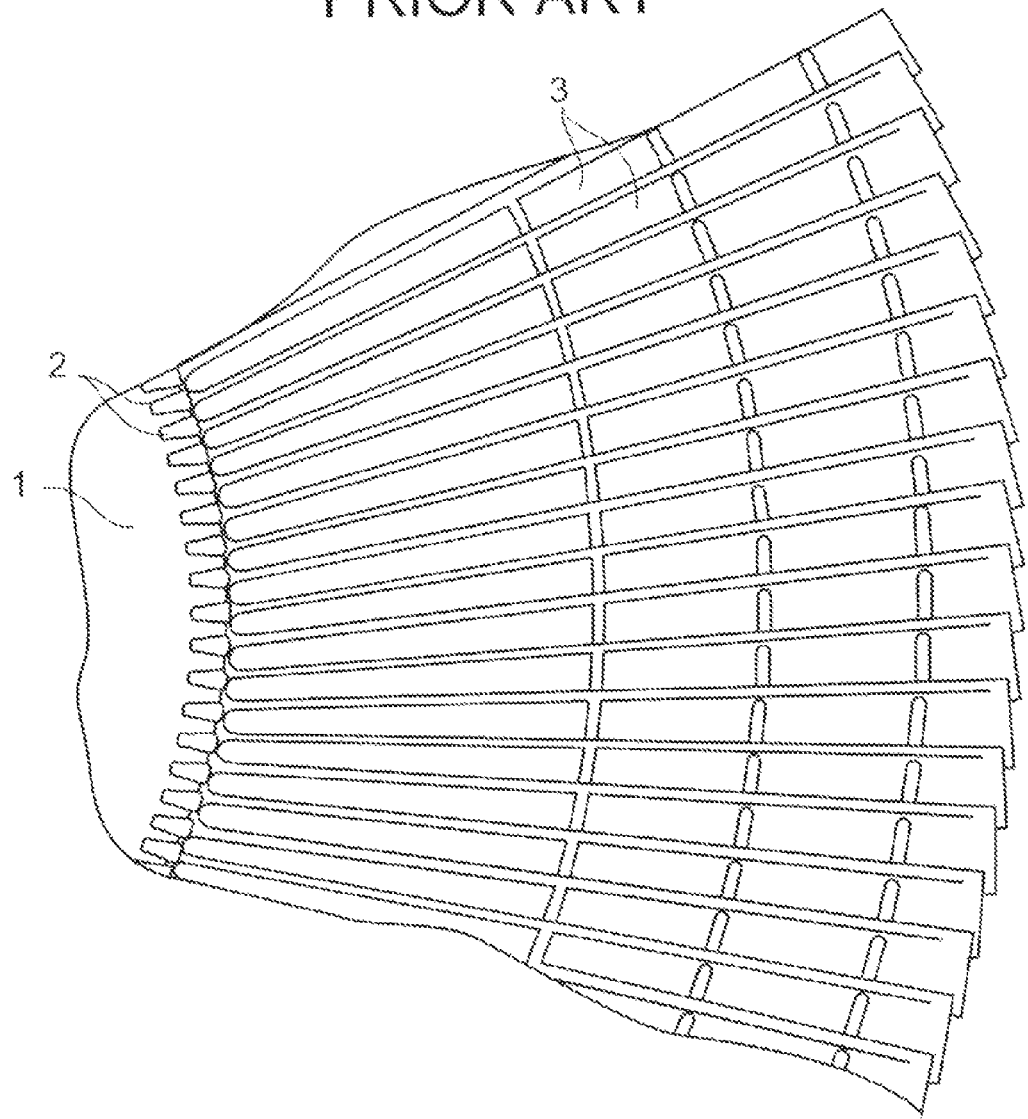
FIG. 12 is a view illustrating a part of a conventional turbine as viewed in the axial direction thereof.

A third embodiment of a grooving work method and a grooving work apparatus according to the present invention will be described with reference to FIGS. 10A and 10B and FIGS. 11A to 11C. FIGS. 10A and 10B are cross-sectional views each illustrating a situation in which a male tree-shaped groove is formed using a third embodiment of the grooving work method according to the present invention. FIG. 10A is a view illustrating a situation in which a first cutting tool 140 is used to carry out cutting, and FIG. 10B is a view illustrating a situation in which a second cutting tool is used to carry out cutting. FIGS. 11A to 11C are views for explaining the shape of the connection portion between a cut portion formed by the first cutting tool and a cut portion formed by the second cutting tool in the third embodiment. FIG. 11C is a cross-sectional view illustrating the entire male tree-shaped groove. FIGS. 11A and 11B are cross-sectional views each illustrating a portion C of FIG. 11C in an enlarged manner. FIG. 11A illustrates a case where the curvature radius of the first cutting tool is smaller than that of the second cutting tool, and FIG. 11B illustrates a case where the curvature radius of the first cutting tool is larger than that of the second cutting tool.

Same reference numerals are given to the same or corresponding parts as those in the first embodiment, and the overlapped description will be omitted.

The present embodiment is a grooving work method and a grooving work apparatus for forming a male tree-shaped groove 102. The male tree-shaped groove 102 has a shape fitted to the shape of the female tree-shaped groove 2 represented in the first or second embodiment. Accordingly, a constricted portion 107, an inclined surface portion 108, an outer circumferential portion 109, and an undercut portion 110 having shapes corresponding to the shapes of the constricted portion 7, the inclined surface portion 8, the outer circumferential portion 9, and the undercut portion 10 of the female tree-shaped groove 2 are formed in the corresponding positions.

As illustrated in the drawings, a first cutting tool 140 provided with first cutting blades 142 is used to carry out the cutting, followed by replacement by a second cutting tool 150 provided with second cutting blades 152, as in the case of the first embodiment. More specifically, the first cutting tool 140 is used to form the constricted portion 107, inclined surface portion 108, outer circumferential portion 109, and undercut portion 110 and then the second cutting tool 150 is used to form a curved portion connecting the outer circumferential portion 109 and the undercut portion 110.

In the present embodiment, the cut portion of the connection portion connecting a portion formed by the first cutting blades 142 of the first cutting tool 140 and the portion formed by the second cutting blades 152 of the second cutting tool 150 has a cross-section of a convex shape. In the case where the curvature radius of the blade edge of the first cutting blades 142 at the connection portion is smaller than that of the blade edge of the second cutting blades 152, an uneven surface is unfavorably generated at the connection portion as illustrated by a portion A of FIG. 11A. On the other hand, in the case where the curvature radius of the blade edge of the first cutting blades 142 is larger than that of the blade edge of the second cutting blades 152, an uneven surface is not generated at the connection portion as illustrated by a portion B of FIG. 11B. In this case, it is preferable that the curvature radius of the blade edge of the first cutting blades 142 have a plus tolerance and the curvature radius of the blade edge of the second cutting blades 152 have a minus tolerance. In the case where, e.g., the nominal dimensions of these curvature radii are equal to each other, a configuration may be employed in which the curvature radius of the blade edge of the first cutting blade 142 has a plus tolerance and the curvature radius of the blade edge of the second cutting blades 152 has a minus tolerance.

Other Embodiment

The above embodiments are merely examples, and the present invention is not limited thereto.

Figure 13:
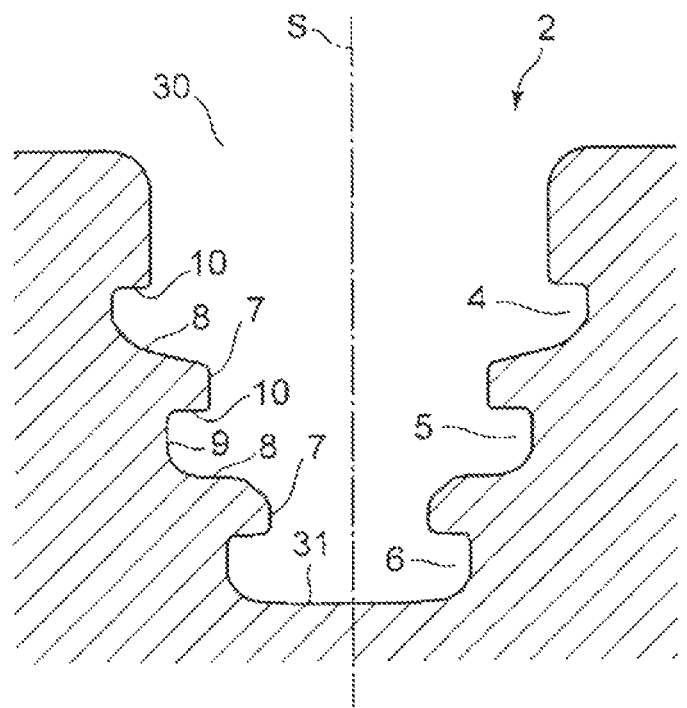
FIG. 13 is a partially enlarged view illustrating one Christmas tree shaped groove formed in a turbine shaft of FIG. 12.

For example, the portion formed by the first cutting tool and portion formed by the second cutting tool are connected at the end the round part of the constricted portion 7 of FIG. 13 on the inclined surface portion 8 in the above embodiments. Alternatively, however, the inclined surface portion 8 and the outer circumferential portion 9 may be formed by using the second cutting tool 50 illustrated in FIGS. 5 and 6. In this case, the inclined surface portion and the round part connecting the outer circumferential portion 9 and the inclined surface portion 8 may be formed to have shapes slightly offset inward by using the first cutting tool 40 illustrated in FIGS. 3 and 4.

Further, while the turbine shaft and the blade legs of the turbine are connected to each other by fitting between the Christmas tree shaped male and female grooves in the present invention, which one of the male and female grooves is to be formed in the turbine shaft or the blade legs of the turbine can arbitrarily be determined.

What is claimed is:

1. A grooving work method for forming a groove having a cross section of a Christmas tree shape for fixing blade legs of a turbine to an outer circumference of a turbine shaft by fitting a female groove and a male member together, wherein
the female groove has a cross section symmetrical with respect to a center line of the groove extending in a groove depth direction from a groove opening portion to a groove bottom portion, and the female groove has two or more larger-width portions each extending from the centerline to a location spaced from the centerline at both sides of the groove in a groove width direction perpendicular to the groove depth direction, and the female groove has one or more constricted portions constricted in the groove width direction and disposed one by one between, in the groove depth direction, adjacent larger-width portions, the larger-width portions and the one or more constricted portions being configured such that the nearer they are to the groove opening portion in the groove depth direction, the larger the width in the groove width direction;

the grooving work method comprises:
at least a first cutting step of performing cutting by using a first cutting tool having a first cutting blade by gradually moving the first cutting blade in a direction perpendicular to an axis parallel to the center line of the groove while rotating the first cutting blade about the axis that is parallel to the center line in order to form each one of the two or more larger-width portions one by one; and
a second cutting step of performing cutting by using a second cutting tool different from the first cutting tool.

2. The grooving work method according to claim 1, wherein
the first cutting step forms: a radially outer portion, with respect to the groove centerline, of each of the larger-width portions, each outer portion having a groove bottom portion side proximal to the groove bottom portion and distal from the groove opening portion, and a groove opening portion side distal from the groove bottom portion and proximal to the groove opening portion;
an inclined surface portion for each of the larger-width portions, inclined with respect to the respective outer portion, extending from the respective outer portion toward the constricted portion that is adjacent to the respective larger-width portion and that is at the groove bottom portion side of the respective outer portion, and
for each of the larger-width portions, an undercut portion adjacent to the groove opening portion side of the respective outer portion, and
wherein the second cutting step forms the one or more constricted portions and a curved portion connecting the respective constricted portion and the inclined surface portion that is adjacent to the respective constricted portion.

3. The grooving work method according to claim 2, wherein
the first cutting tool has a curved convex cutting edge portion.

4. The grooving work method according to claim 2, wherein
the second cutting tool has a curved concave cutting edge portion.

5. The grooving work method according to claim 2, wherein
a length of the first cutting blade of the first cutting tool in the groove depth direction is shorter than a length of the larger-width portions in the groove depth direction, and
the first cutting step of using the first cutting tool to form the respective larger-width portions also includes:
a bottom side cutting step of cutting the groove bottom portion sides of the outer portions of the larger-width portions;

an opening portion side cutting step of cutting the groove opening sides of the outer portions and also cutting the undercut portions of each of the respective larger-width portions; and a movement step of moving, between the bottom side cutting step and the opening portion side cutting step, the first cutting tool in the tree-shaped groove depth direction.

6. The grooving work method according to claim 1, further including the step of machining the male member, wherein the male member has a cross section of a Christmas tree shape, wherein a third cutting tool and a fourth cutting tool are used to perform the machining of the male member.

* * * * *